(12) United States Patent
He et al.

(10) Patent No.: US 8,643,748 B2
(45) Date of Patent: Feb. 4, 2014

(54) COMPACT STATIONARY LENS OPTICAL ZOOM IMAGE CAPTURE SYSTEM

(75) Inventors: Fan He, Gurnee, IL (US); Michael Frenzer, Palatine, IL (US); Kevin Johnson, Mundelein, IL (US); Dongxue Wang, Palatine, IL (US)

(73) Assignee: Motorola Mobility LLC, Libertyville, IL (US)

( * ) Notice: Subject to any disclaimer, the term of this patent is extended or adjusted under 35 U.S.C. 154(b) by 597 days.

(21) Appl. No.: 11/943,249

(22) Filed: Nov. 20, 2007

(65) Prior Publication Data

US 2009/0128664 A1   May 21, 2009

(51) Int. Cl.
*H04N 5/262* (2006.01)
*H04N 5/225* (2006.01)

(52) U.S. Cl.
USPC ........................................ 348/240.1; 348/344

(58) Field of Classification Search
USPC .......... 348/240.1, 335; 359/196, 495; 385/18; 396/529
See application file for complete search history.

(56) References Cited

U.S. PATENT DOCUMENTS

| | | | |
|---|---|---|---|
| 4,322,130 A | 3/1982 | Ito et al. | |
| 4,881,127 A | 11/1989 | Isoguchi et al. | |
| 5,294,990 A | 3/1994 | Aoki | |
| 5,748,371 A | 5/1998 | Cathey et al. | |
| 5,909,246 A | 6/1999 | Terashima | |
| 6,373,640 B1 | 4/2002 | Betensky et al. | |
| 6,437,925 B1 | 8/2002 | Nishioka | |
| 6,781,127 B1 | 8/2004 | Wolff et al. | |
| 6,833,223 B2 | 12/2004 | Shiraishi | |
| 6,842,297 B2 | 1/2005 | Dowski | |
| 6,999,649 B1 * | 2/2006 | Chen et al. | 385/18 |
| 7,042,615 B2 | 5/2006 | Richardson | |
| 7,116,480 B1 * | 10/2006 | Li | 359/495 |
| 7,414,665 B2 | 8/2008 | Watanabe et al. | |
| 7,450,187 B2 | 11/2008 | Sun | |
| 7,493,032 B2 | 2/2009 | Chang | |
| 2002/0080263 A1 | 6/2002 | Krymski | |

(Continued)

FOREIGN PATENT DOCUMENTS

| | | |
|---|---|---|
| JP | 56052708 | 5/1981 |
| JP | 2007-140308 | 6/1995 |

(Continued)

OTHER PUBLICATIONS

PCT Search Report, PCT/US2008/084048.

(Continued)

*Primary Examiner* — James Hannett
*Assistant Examiner* — Akshay Trehan

(57) ABSTRACT

An electronic optical zoom system (100) includes a first lens assembly (101) and a second lens assembly (102). The first lens assembly (101) and the second lens assembly (102) may be adjacently disposed or concentrically disposed. The first lens assembly (101) and second lens assembly (102), in one embodiment, have different magnification configurations. An image sensor (103) captures electronic images of a subject (109). Optical zoom capability is achieved by an alterable electronic optical device (851), such as a switchable mirror (105). The alterable electronic optical device (851) selectively redirects received light between a first optical path (107) from a reflective surface (106) to a second optical path (117) from the alterable electronic optical device (851) depending upon the state of the alterable electronic optical device (851). The electronic optical zoom system (100) thereby provides optical zoom capabilities in a compact package without the need for physically moving lens assemblies.

16 Claims, 6 Drawing Sheets

(56) References Cited

U.S. PATENT DOCUMENTS

| | | | |
|---|---|---|---|
| 2002/0136150 A1 | 9/2002 | Mihara et al. | |
| 2003/0007088 A1 | 1/2003 | Rantanen et al. | |
| 2003/0052989 A1 | 3/2003 | Bean et al. | |
| 2003/0179382 A1 | 9/2003 | Peterson | |
| 2004/0021921 A1* | 2/2004 | Richardson | 359/196 |
| 2004/0179125 A1* | 9/2004 | Nagaoka | 348/335 |
| 2004/0184163 A1 | 9/2004 | Nishioka et al. | |
| 2005/0154318 A1 | 7/2005 | Sato | |
| 2006/0098968 A1 | 5/2006 | Ito et al. | |
| 2007/0166026 A1* | 7/2007 | Matsuzawa et al. | 396/529 |
| 2007/0183760 A1 | 8/2007 | Mizuno et al. | |
| 2008/0129857 A1 | 6/2008 | Vau et al. | |
| 2008/0158551 A1 | 7/2008 | Hess | |
| 2009/0109309 A1 | 4/2009 | He et al. | |
| 2009/0128682 A1 | 5/2009 | He et al. | |

FOREIGN PATENT DOCUMENTS

| | | |
|---|---|---|
| JP | 2003-161874 | 6/2003 |
| JP | 2006-171449 | 6/2006 |
| KR | 10-2007-0005947 | 6/2008 |
| WO | WO-2005/125184 | 12/2005 |
| WO | WO-2006/095110 | 9/2006 |

OTHER PUBLICATIONS

PCT Search Report, PCT/US2008/084022.

Kent Optronics, "Kent Optronics Switchable Mirror Technology", http://www.kentoptronics.com/technologies.htm#SwitchableMirror.

Cowan, Euel K., "Non-Final Office Action", U.S. Appl. No. 11/943,224, filed Nov. 20, 2007, Fan He, inventor, Mailed Mar. 31, 2010.

Cowan, Euel K., "Final Office Action", U.S. Appl. No. 11/943,224, filed Nov. 20, 2007; Mailed Nov. 23, 2010.

Cowan, Euel K., "NonFinal Office Action", U.S. Appl. No. 11/943,224, filed Nov. 20, 2007; Mailed Nov. 29, 2011.

Cowen, Euel K., "Notice of Allowance", U.S. Appl. No. 11/943,224, filed Nov. 20, 2007; Mailed Mar. 20, 2012.

Patent Cooperation Treaty, "PCT Seach Report and Written Opinion of the International Searching Authority" for International Application No. PCT/US2008/079036 May 28, 2009, 12 pages.

United States Patent and Trademark Office. "Non-Final Rejection" for U.S. Appl. No. 11/931,828, dated Dec. 30, 2009, 14 pages.

United States Patent and Trademark Office, "Non-Final Rejection" for U.S. Appl. No. 11/931,828 dated May 13, 2010, 18 pages.

* cited by examiner

COMPACT STATIONARY LENS OPTICAL ZOOM IMAGE CAPTURE SYSTEM

BACKGROUND

1. Technical Field

This invention relates generally to image capture devices having optical zoom capabilities, and more particularly to an image capture device having an electronically switchable optical zoom capability that can change an image magnification without lens movement relative to an image sensor.

2. Background Art

People today are taking more pictures. Advances in technology have made this possible. Prior to the advent of digital photography and digital cameras, a person wanting to take a picture of a friend had to invest in expensive cameras, professional lenses, several rolls of film, and costly film processing. Today, however, digital cameras fit into a pocket and enable people to take pictures more effortlessly.

When purchasing a camera, photographers often prefer cameras with some type of zoom magnification capability. A "zoom" camera is simply one that is capable of changing a magnification of an image. In the world of digital photography, zoom capability comes in one of two forms: digital zoom and optical zoom.

In an optical zoom system, mechanical motors and gears within the camera move the lens element relative to the film or image sensor to adjust the focal length of the system. The space between the lens elements and the film or image sensor changes, thereby altering the optical magnification of the system. By contrast, in a digital or electronic zoom system, the lens elements remain stationary at a physically fixed distance relative to image sensor. Image magnification is altered by blowing up and cropping a subsection of an image. As such, the user sees only a portion of the image. Digital zoom reduces the number of pixels used to generate the stored image. Photo enthusiasts generally prefer optical zoom systems due to their higher quality images. Digitally magnified images often appear grainy and sometimes look out of focus, as less data is used for an equally sized, zoomed image.

Optical zoom systems are problematic for small electronic devices. A first problem is that they are mechanical in nature, requiring substantial space for many moving parts. Even in a small optical zoom system, the lens elements may have to move across a range of tens of millimeters to cover a 2 to 1 or 3 to 1 magnification range. In small, handheld devices, such as mobile phones and the like, there is often insufficient space for the motors, lens motion assemblies, and other components that are required. For this reason alone, conventional optical zoom systems have traditionally been too large and fragile for handheld electronic devices such as mobile telephones.

Next, optical zoom systems are slow. In conventional mechanical optical zoom systems, such as those found in traditional 35 millimeter cameras, it may take a time of several hundred milliseconds to several seconds to alter the magnification by physically moving the lens relative to the image sensor and then reacquiring focus. When a child takes his first steps, parents may find themselves disappointed to miss such a memorable event because of delay caused by the optical zoom system.

Third, optical zoom systems rely on motors and gears. These motors and gears are mechanical components, and are therefore subject to wear. Continued wear can lead to component failure.

There is thus a need for an improved optical zoom system for compact portable electronic devices.

BRIEF DESCRIPTION OF THE DRAWINGS

The accompanying figures serve to further illustrate various embodiments and to explain various principles in accordance with the present invention.

Figure 1:
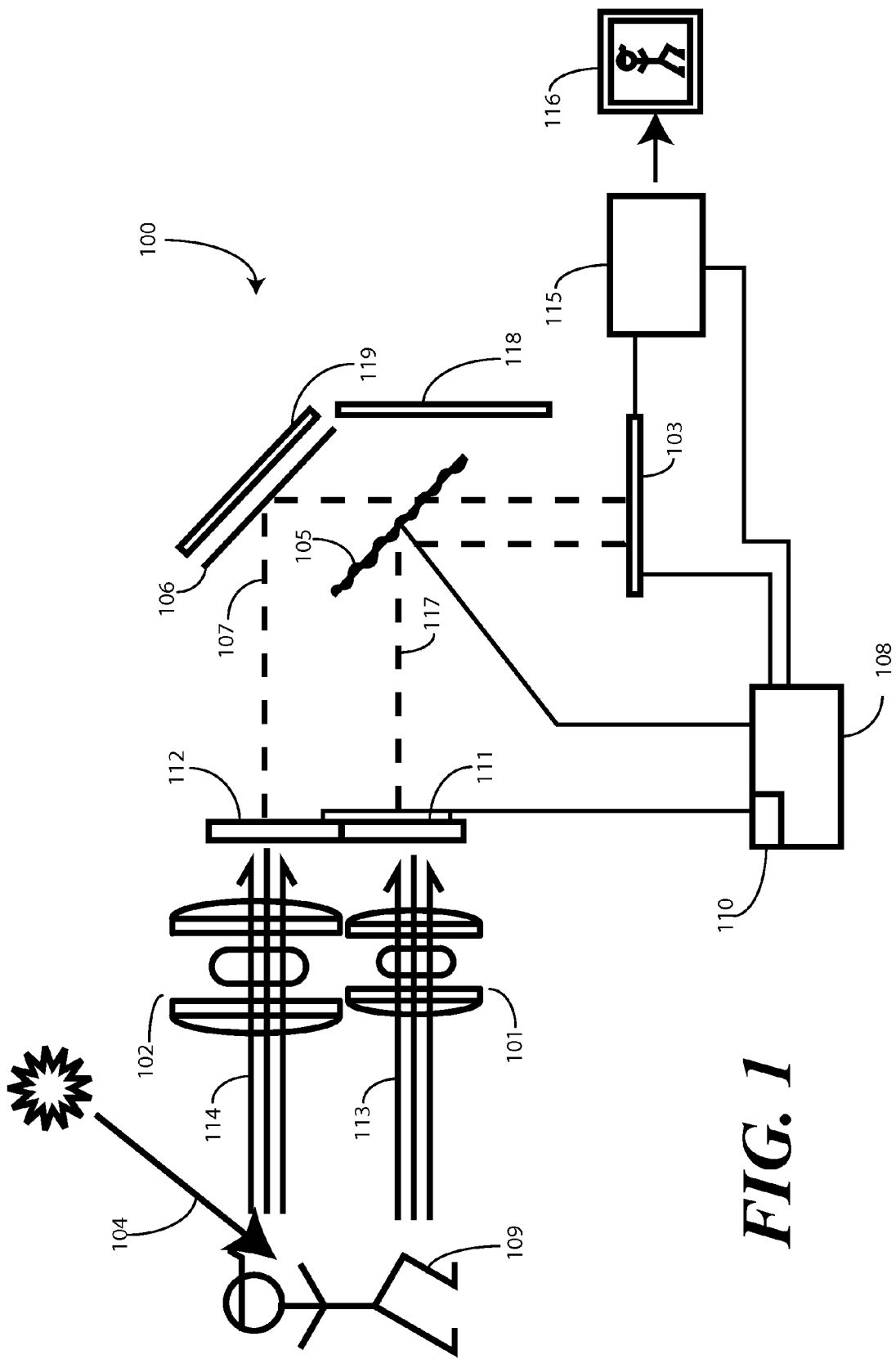
FIG. 1 illustrates a block diagram of one embodiment of an electronic optical zoom system in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to an electronic optical zoom system for an image capture configured to electronically alter a system magnification without changing the physical distance of the lens assembly relative to the image sensor. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of electronically performing an optical zoom function as described herein. The non-processor circuits may include, but are not limited to, a microprocessor associated memory, signal drivers, clock circuits, power source circuits, and user input devices. As such, these functions may be interpreted as steps of a method to perform electronically performing the optical zoom function. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention provide an image capture system offering optical zoom capabilities with a lens assembly that is stationary relative to the image sensor. Embodiments of the present invention employ an electronically alterable optical device, such as a switchable mirror, to electronically cause redirection of light from one of multiple lens structures to an image sensor. The switchable mirror is capable of being electronically switched from a reflective state to a pellucid state, and vice versa. By electronically switching the switchable mirror, the system provides different, discrete, electronically selectable states of optical zoom. The switchable mirror allows a controller to select between different focal length paths while using only a single sensor.

The switchable mirror allows the system to switch between two or more optical paths rather than using motors and gears to move the lenses relative to the image sensor. This allows the overall system to be more compact than conventional optical zoom systems. Experimental testing has shown that the overall size of an image capture system can be reduced by at least 50% compared to mechanical optical zoom systems when using embodiments of the invention.

In addition to the switchable mirror used to redirect light from one of multiple lens assemblies, additional switchable mirrors may be employed to act as both shutters and aperture devices. Aperture states may be configured such that systems in accordance with embodiments of the invention provide aperture capabilities equivalent to a conventional "F stop" range of at least 2.8 to 8. Once the proper aperture/optical path configuration is chosen, image processing techniques may be applied to the captured image to properly process the image.

One embodiment of a system in accordance with the present invention offers a quarter-inch sensor array system having three-times optical zoom capability in a package size measuring 10×7×6 millimeters, including the shutter/aperture device. Such a package is suitable for small, portable electronic devices such as mobile telephones, personal digital assistants, and handheld computers. The system is also suitable for small digital cameras as well. Conventional optical zoom systems employing quarter-inch lens assemblies have measurements on the order of 25×9×8 millimeters. A one third inch sensor array system with three-times optical zoom capability can be manufactured with dimensions of 11×8×6 millimeters or less in accordance with embodiments of the invention. Additionally, no moving components are required to alter the optical zoom of the system.

Turning now to FIG. 1, illustrated therein is a block diagram of an electronic optical zoom system 100 in accordance with embodiments of the invention. The electronic optical zoom system 100 includes a first lens assembly 101, a second lens assembly 102, and an image sensor 103. Each lens assembly is used for receiving and directing light. While it will be obvious to one of ordinary skill in the art having the benefit of this disclosure that three, four, five, or more lens assemblies may be employed to provide the optical zoom capabilities described herein, for discussion purposes, two lens assemblies will be used for illustration.

The first lens assembly 101 and second lens assembly 102, in one embodiment, have different magnification properties. The first lens assembly 101 has a shape, material characteristic, and/or other optical design characteristic such that light 104 passing through the first lens assembly 101 to the image sensor 103 presents an image having a first magnification. The second lens assembly 102 has a shape, material characteristic, and/or other optical design characteristic such that light 104 passing through the second lens assembly 102 to the image sensor 103 presents an image having a second magnification. By way of example, if the first lens assembly 101 is a base line "1×" lens, the second lens assembly 102 may have a magnification that is three times that of the first lens assembly 101. As such, the second lens assembly 102 would be a "3×" lens assembly.

The lens assemblies may be oriented in different physical configurations. In one embodiment the first lens assembly 101 and the second lens assembly 102 are adjacently disposed. In another embodiment, the first lens assembly 101 and the second lens assembly 102 are concentrically disposed. In yet another embodiment, the first lens assembly 101 and the second lens assembly 102 are orthogonally disposed. Other configurations will be clear to those of ordinary skill in the art having the benefit of this disclosure.

The first lens assembly 101 and the second lens assembly 102 may each comprise a single lens element. Alternatively, either of the first lens assembly 101 or the second lens assembly 102 can consist of a group of lens elements to, for example, minimize aberrations between image subject 109 or object and the image sensor 103. The lens assemblies are physically and geometrically stationary relative to the image sensor 103. The electronic optical zoom function is achieved without movement of either lens assembly relative to the image sensor 103. Thus, motors, cams, gears, and other mechanical parts of motion are not required.

The image sensor 103 is an electronic device configured to sense light and convert that light into binary data suitable for processing by an image processor. Suitable image sensors include charge coupled devices or CMOS sensors. Each of these typically employ an array of light detecting elements formed as part of a semiconductor, sometimes referenced as cells, to convert incident light into a change in storage charge or a voltage change. Once converted, processing circuitry reads the charge status of each cell in the sensor and converts this status to a binary value. These values are then stored in memory (not shown).

Light is redirected from either the first lens assembly 101 or the second lens assembly 102 to the image sensor 103 by a switchable mirror 105 and, optionally, a reflective surface 106. The reflective surface, which may be any of a conventional mirror, a switchable mirror, a phase shifting mirror, or other equivalent device, redirects light 104 to the image sensor 103 along an optical path 107. In one embodiment, the reflective surface 106 is positioned so as to cause the optical path 107 to be redirected orthogonally. Said differently, light passing through one of the first lens assembly 101 or the second lens assembly 102 turns, approximately 90 degrees, as it makes its journey to the image sensor 103. In other embodiments, such as that shown in FIG. 3, the optical path is non-orthogonal and includes multiple redirection reflections.

The switchable mirror 105, in one embodiment, is disposed between the reflective surface 106 and the lens assemblies 101,102 along the optical path 107. The switchable mirror 105 has electronically controllable states of varying reflectivity. For instance, in one embodiment, the switchable mirror 105 has both a reflective state and a pellucid state. In the reflective state, the switchable mirror 105 operates as a reflective surface and resembles a glass or metallic mirror. In the pellucid state, the switchable mirror 105 becomes translucently clear—essentially like glass—transmitting substantially all incident light 104. Note that it may not be absolutely transparent, in that some loss arises due to the controlling electrodes or film surfaces integrated into the switchable mirror 105.

While some embodiments described herein employ the generally reflective state—referred to herein as the reflective state—and the generally clear state—referred to as the pellucid state—note that it is also possible to configure the switchable mirror 105 in other states as well. Intermediate transmittance or reflectance states can be achieved by altering a control voltage applied to the switchable mirror 105 by a controller 108. The controller 108, which may be any of a microprocessor, application specific circuit, programmable logic device, or equivalent, is capable of electronically switching the switchable mirror 105 to a desired state of reflectivity. The controller 108, in one embodiment, is configured to electronically alter the switchable mirror 105 to either a reflective state or a pellucid state. In accordance with embodiments of the invention, and where the controller 108 is also coupled to the image sensor 103, the controller 108 is able to capture a first magnification image with the image sensor 103 when the switchable mirror 105 is in a reflective state, and a second magnification image when the switchable mirror 105 is in the pellucid state.

Suitable switchable mirrors for use with embodiments of the invention are taught, for example, in U.S. Pat. No. 7,042,615, issued to Richardson on May 9, 2006, entitled "Electrochromic Devices Based on Lithium Insertion." Other switchable mirrors are commercially available from companies such as Kent Optronics, Inc. of Kent, Ohio. The switchable mirrors generally are low power devices, consuming little energy in operation, which is beneficial to portable electronics. The power required to switch an exemplary switchable mirror 105 from state to state is on the order of 250 microwatts.

Figure 4:
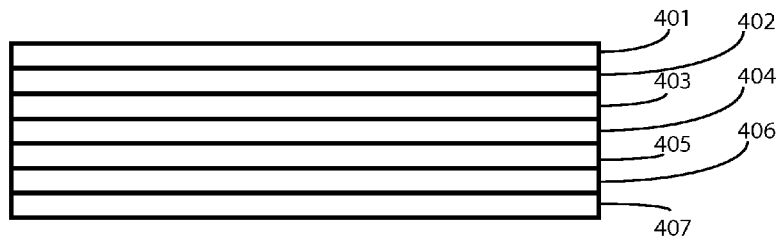
FIG. 4 illustrates a sectional view of one embodiment of a switchable mirror in accordance with embodiments of the invention.

Turning briefly to FIG. 4, illustrated therein is a cross section of a switchable mirror (105). In the embodiment of FIG. 4, the switchable mirror (105) is an electrolyte-based device that may be changed from a reflective state to a pellucid state with the application of voltage to a pair of electrodes 403,405. The electrodes 403,405 are disposed about an electrolyte layer 404, which in one embodiment comprises lithium phosphorous oxynitride (LiPON). Each electrode 403,405 is adjacent to a layer of transparent conductive oxide 402,406, such as indium tin oxide (ITO) or the zinc oxide (ZnO), which is used for making electrical connections. The overall assembly resides between two layers of glass 401,407.

Figure 5:
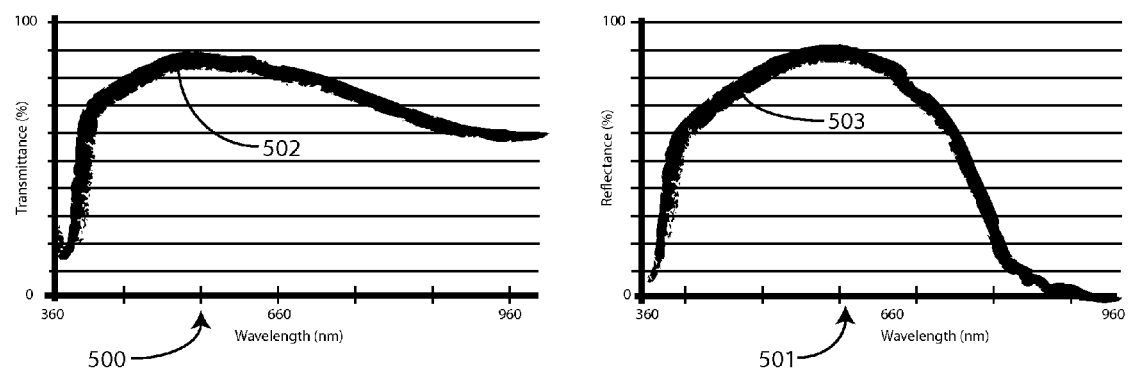
FIG. 5 illustrates graphs of transmittance and reflectance properties of one embodiment of a switchable mirror in accordance with embodiments of the invention.

Turning briefly to FIG. 5, illustrated therein are the physical properties of such a switchable mirror (105). Graph 500 shows a transmission plot 502 versus wavelength of a switchable mirror (105) in the pellucid state, while graph 501 shows a reflectivity plot 503 versus wavelength of a switchable mirror (105) in a reflective state. Note that these plots are taken from exemplary switchable mirrors positioned at a 45-degree angle relative to the incident light. Note also, that to the extent color or other luminous properties are affected by the switchable mirror being placed in the optical path, color or other image correcting techniques may be desired or beneficial. For example, it may be beneficial to tune the image sensor more toward the red end of the visible spectrum by altering the color filters of the sensor. Alternatively, it may be beneficial to amplify or attenuate certain frequencies so as to approximate a flat frequency response across the visible spectrum. Color correction algorithms in software may also be employed.

Turning now back to FIG. 1, the electronic optical zoom system 100 can also employ one or more switchable iris mirrors 111,112. The switchable iris mirrors 111,112, in one embodiment, are also switchable mirrors. Rather than being generally controllable, the electrodes of the switchable iris mirrors 111,112 have been deposited in a concentric circle fashion, thereby offering regional control capabilities. The use of switchable mirrors as the switchable iris mirror is advantageous in that the controller 108, by way of an iris control module 110, may simply select whether the sections of the switchable iris mirrors are reflective or translucent, thereby determining what aperture or iris state they should have. Embodiments of the invention are not limited to the use of switchable mirrors as switchable iris devices, however. Other devices, such as conventional mechanical shutters and aperture devices may also be used.

Figure 6:
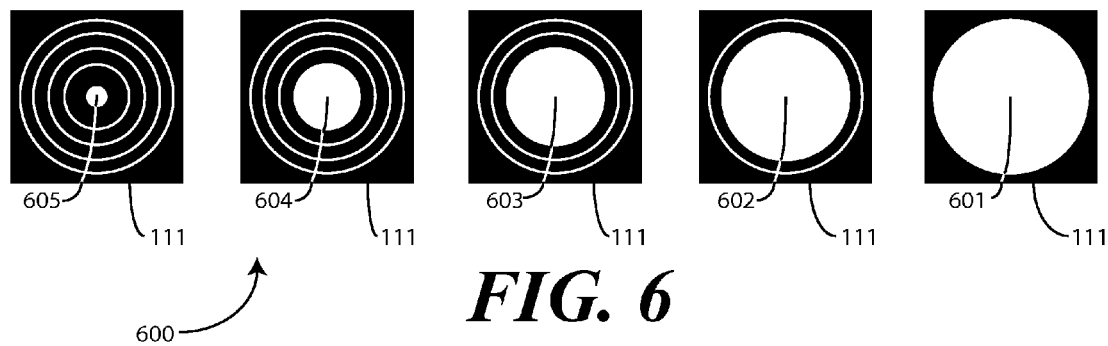
FIG. 6 illustrates plan views of various states of one embodiment of a switchable mirror having an aperture state in accordance with embodiments of the invention.

In one embodiment, a first switchable iris mirror 111 is a switchable mirror having electronically variable aperture states. Turning briefly to FIG. 6, illustrated therein are exemplary aperture states 600 for the switchable iris mirrors (111, 112) when switchable mirrors are used. By selectively depositing the electrodes (403,405) and the transparent conductive oxide layers (402,406), various concentric circles 601,602, 603,604,605 may be controllable along the switchable iris mirror 111. By selectively actuating the various concentric circles 601,602,603,604,605, the "aperture" may be opened and closed, as well as partially opened or closed a predetermined amount. Note also that by selectively actuating all concentric circles 601,602,603,604,605, the switchable iris mirrors (111,112) may be used as shutters as well.

Turning back to FIG. 1, the first switchable iris mirror 111 has a first set of electronically variable aperture states. The first switchable iris mirror 111 is disposed so as to be capable of limiting first lens assembly light 113 upon selection of a first switchable iris mirror state. When the first switchable iris mirror 111 is in a completely reflective state, the first switchable iris mirror 111 helps to prevent first lens assembly light 113 from reaching the image sensor 103.

Similarly, the second switchable iris mirror 112 has a second set of electronically variable aperture states. The second switchable iris mirror 112 is disposed so as to be capable of limiting second lens assembly light 114 upon selection of a second switchable iris mirror state. When the second switchable iris mirror 112 is in a completely reflective state, the second switchable iris mirror 112 helps to prevent second lens assembly light 114 from reaching the image sensor 103.

The iris control module 110, which may be a stand-alone controller, or may be a firmware or hardware module of the controller 108, is coupled to the first switchable iris mirror 111 and the second switchable iris mirror 112. The iris control module 110 is configured to select one of the electronically variable aperture states for the first switchable iris mirror 111, and to additionally select one of the variable aperture states for the second switchable iris mirror 112. When, for example, an image of a first magnification is desired, the iris control module 110 can switch the first switchable iris mirror 111 into an aperture state while making the second switchable iris mirror 112 reflective. Similarly, when an image of a second magnification is desired, the iris control module 110 can switch the second switchable iris mirror 112 to an aperture state while making the first switchable iris mirror 111 reflective.

The system image magnification can be varied by electronically altering the state of the switchable mirror 105. By way of example, when the switchable mirror 105 is in the reflective state, the switchable mirror 105 redirects light 104 from one of the first lens assembly 101 or the second lens assembly 102—depending upon system configuration—to the image sensor 103 along optical path 117. (Note that the first lens assembly 101 and second lens assembly 102 can be reversed.) When the switchable mirror 105 is in the pellucid state, light 104 from an other of the first lens assembly 101 or the second lens assembly 102 passes through the switchable mirror 105 to the image sensor 103. In the embodiment of FIG. 1, when the switchable mirror 105 is in the pellucid state, light 104 reflects off the reflective surface 106 and then passes through the switchable mirror 105 to the image sensor 103 along optical path 107.

An image processing circuit 115 is coupled to the image sensor 103. The image processing circuit 115 is configured to generate a composite image 116 of a system magnification by processing the image to achieve the desired photographic requirements, including color balance, sharpness, hue, saturation and so forth.

Now that the general operation of the components has been explained, consider a more specific example of operation of the system 100. In the embodiment of FIG. 1, the first lens assembly 101 and the second lens assembly 102 are adjacently disposed. Suppose the first lens assembly 101 has a baseline 1× magnification. The second lens assembly 102 has three times the magnification of the first lens assembly 101, and thus will be a 3× lens.

The reflective surface 106 is disposed so as to redirect light from the second lens assembly 102 to the image sensor 103 along optical path 107. An optional switchable iris mirror 112 is positioned between the second lens assembly 102 and the reflective surface 106. The switchable iris mirror 112, under the control of the iris control module 110 of the controller 108, is capable of either reducing the amount of second lens assembly light 114 from reaching the image sensor 103 or acting as a shutter. When in the reflective state, the switchable iris mirror 112 is capable of essentially prohibiting second lens assembly light 114 from reaching the reflective surface 106. Another optional switchable iris mirror 111 may be disposed between the first lens assembly 101 and the switchable mirror 105 for performing a corresponding function.

When the system 100 is in a first system magnification mode, such as the 1× mode, the switchable mirror 105 is in the reflective state. As such, light 104 reflects off a subject 109 and passes through the first lens assembly 101 as first lens assembly light 113. Where a switchable iris mirror 111 is used, the switchable iris mirror 111 may be placed in an aperture state so as to limit the amount of first lens assembly light 113 that reaches the image sensor 103.

As the switchable mirror 105 is in the reflective state, the first lens assembly light 113 reflects off the switchable mirror 105 to the image sensor 103 along optical path 117. The image sensor 103 thus receives an image having a first system magnification, which in this example is a 1× magnification. Where the controller 108 is also coupled to the image sensor 103, the controller 108 may then cause an image to be captured having a first magnification (1×) with the image sensor 103.

When the system 100 switches to an optical zoom or second system magnification mode, such as the 3× mode, several changes occur. First, where the switchable iris mirror 111 is used, the iris control module 110 causes the switchable iris mirror 111 to enter the reflective state. This effectively prohibits first lens assembly light 113 from reaching the switchable mirror 105. To further ensure that first lens assembly light 113 does not reach the image sensor 103, light absorbing material 118 may be placed opposite the switchable mirror 105 relative to the first lens assembly 101.

Next, or concurrently, the controller 108 causes the switchable mirror 105 to enter the pellucid state. With the switchable mirror 105 in the pellucid state, any stray first lens assembly light 113 would pass through the switchable mirror 105 to the light absorbing material 118. Additionally, where switchable iris mirror 112 is used, the iris control module 110 causes the switchable iris mirror 112 to enter an aperture state. With the switchable mirror 105 in the pellucid state, light 104 reflects off the subject 109 and through the second lens assembly 102 as second lens assembly light 114. This second lens assembly light 114 reflects off the reflective surface 106 and passes through the pellucid switchable mirror 105 to the image sensor 103 along optical path 107. Thus, the image sensor 103 receives an image having 3× magnification. Where the controller 108 is also coupled to the image sensor 103, the controller 108 may then cause an image to be captured having a second magnification (3×) with the image sensor 103.

Note that the reflective surface 106 in the embodiment of FIG. 1 can also be a switchable mirror itself having electronically selectable varying reflectivity states. Where this is the case, when the system 100 is in the 1× mode, the reflective surface 106 could be switched to a pellucid state. As such, any stray second lens assembly light 114 would not be reflected to the image sensor 103. Additional light absorbing material 119, which may just be an extension of light absorbing material 118, may be disposed behind the reflective surface in such a configuration. Stray second lens assembly light 114 would thus pass through the second switchable mirror to the additional light absorbing material 119.

Figure 2:
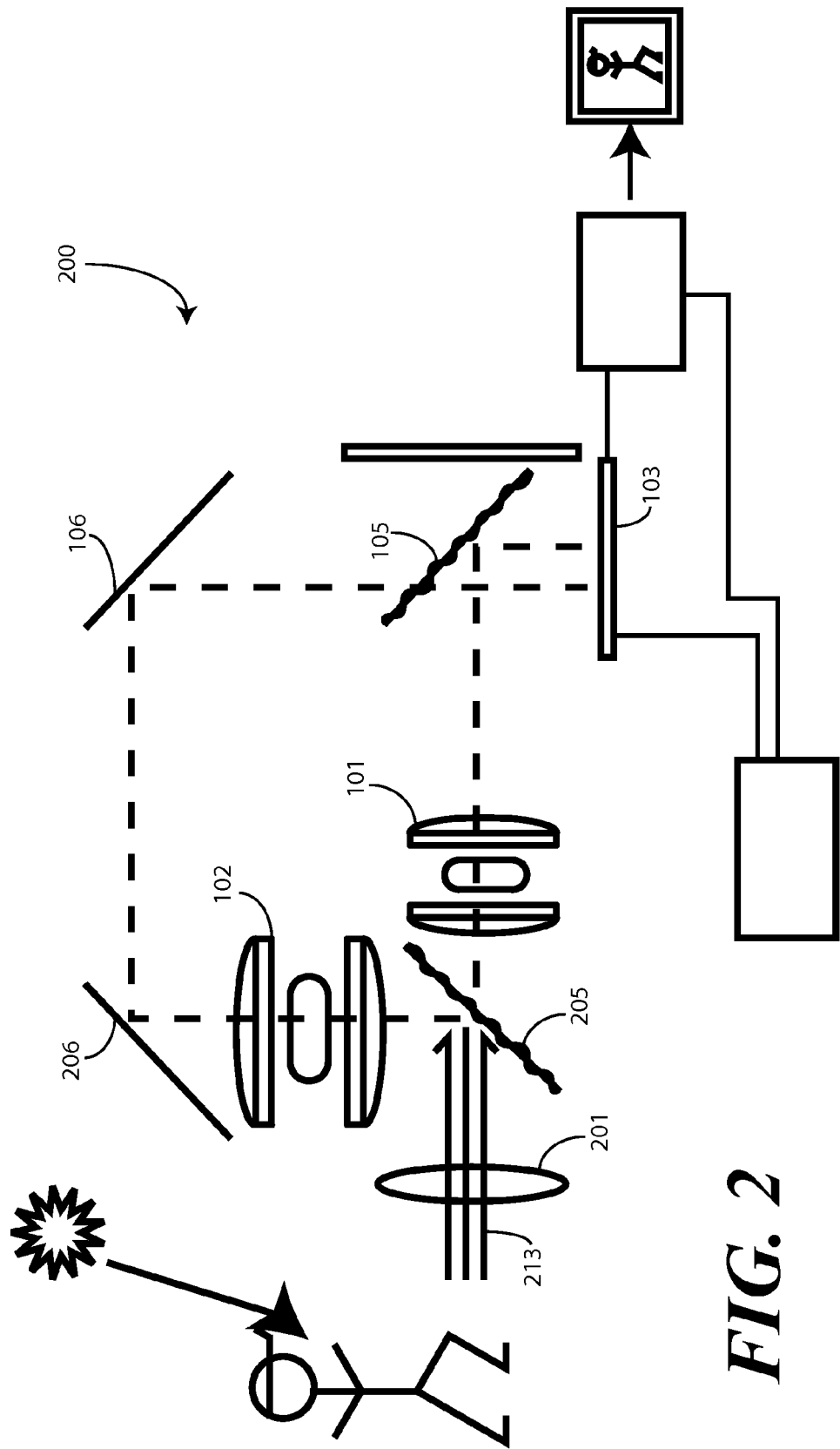
FIG. 2 illustrates a block diagram view of an electronic optical zoom system having an orthogonal lens configuration in accordance with embodiments of the invention.

Turning now to FIG. 2, illustrated therein is an alternate embodiment of an electronic optical zoom system 200 in accordance with the invention. The embodiment of FIG. 2 is similar to that of FIG. 1. However, rather than having the first lens assembly 101 and second lens assembly 102 adjacently disposed, they are orthogonally disposed. Additionally, a second switchable mirror 205 and a second reflective surface 206 have been included. The embodiment of FIG. 2, while functioning in a similar fashion to the system 100 of FIG. 1, allows for an electronic device having only one photographic aperture 201 rather than two adjacently disposed lens assemblies.

In FIG. 2, which the system 200 is in the 1× mode, the second switchable mirror 205 is in the pellucid state. The first switchable mirror 105 is in the reflective state. Incident light 213 passes through the second switchable mirror 205, through the first lens assembly 101, and is reflected off the first switchable mirror 105 to the image sensor 103.

When the system 200 is in the 3× mode, the second switchable mirror 205 is in the reflective state. The first switchable mirror 105 is in the pellucid state. Incident light 213 reflects off the second switchable mirror 205 to the second reflective surface 206 and is directed to the first reflective surface 106. The light is redirected off the first reflective surface 106 through the first switchable mirror 105 to the image sensor 103. Note that switchable iris mirrors may be used either with the photographic aperture 201, or with the first lens assembly 101 and the second lens assembly 102.

Figure 3:
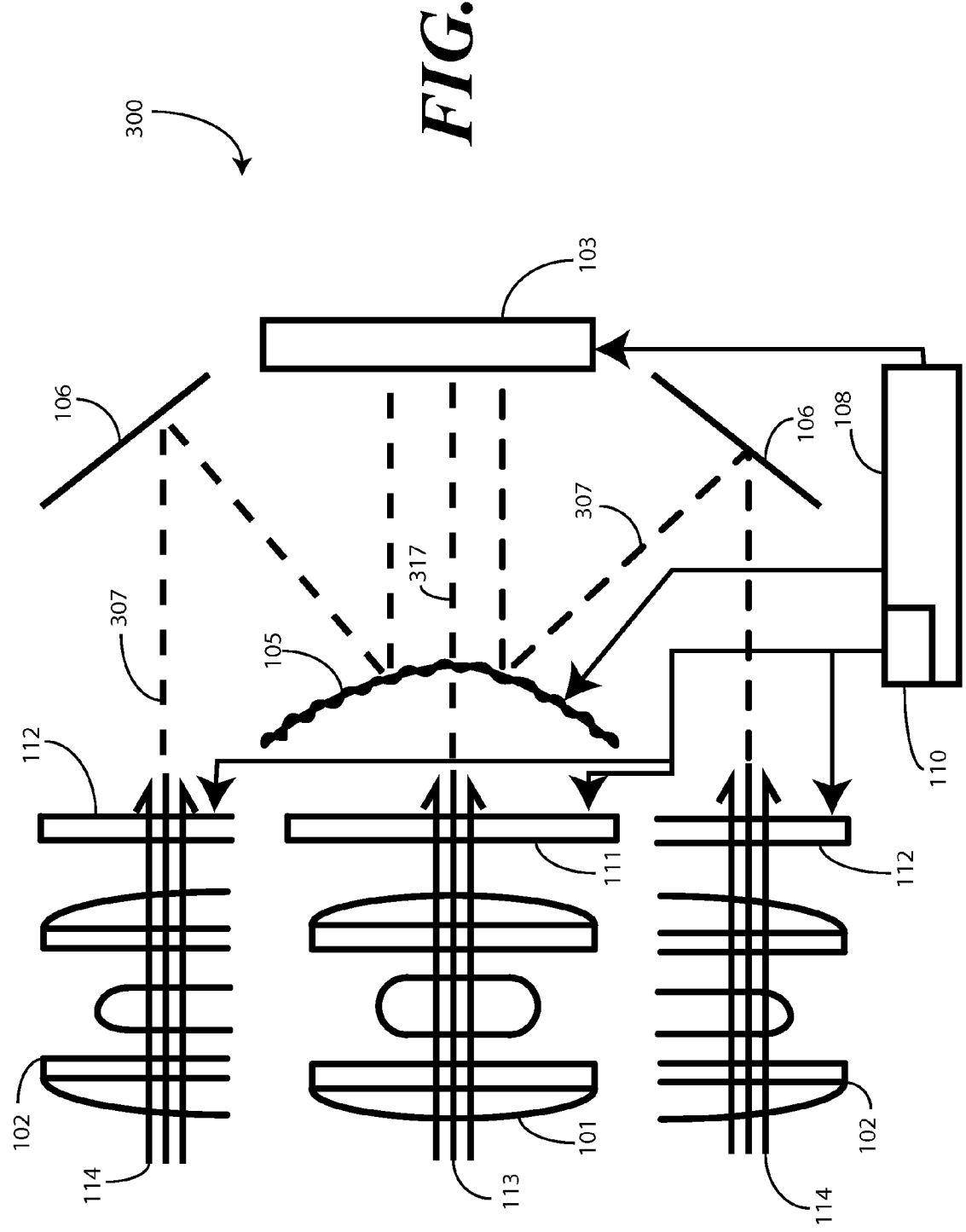
FIG. 3 illustrates a block diagram view of an electronic optical zoom system having a concentric lens configuration in accordance with embodiments of the invention.

Turning now to FIG. 3, illustrated therein is one embodiment of an electronic optical zoom system 300 where the first lens assembly 101 and the second lens assembly 102 are concentrically disposed (shown in a sectional view). In the embodiment of FIG. 3, as with the embodiment of FIG. 1, for illustration purposes the first lens assembly 101 will have a baseline 1× magnification. The second lens assembly 102 will have three times the magnification of the first lens assembly 101, and thus will be a 3× lens. It will be obvious to those of ordinary skill in the art having the benefit of this disclosure that other magnification differences may be used.

In the embodiment of FIG. 3, the switchable mirror 105 is axially aligned with the first lens assembly 101. Further, the reflective surface 106 and the image sensor 103 are concentrically aligned. The switchable mirror 105 is rounded, although various angular configurations could equally be used.

When the system 300 is in the 1× mode, the controller 108 causes the switchable mirror 105 to enter the pellucid state. Where a switchable iris mirror 112 is used, the iris control module 110 causes the switchable iris mirror 112 to enter the reflective state. With the switchable mirror 105 in the pellucid state, incident first lens assembly light 113 passes from the first lens assembly 101, through the switchable mirror 105, to the image sensor 103 along a substantially linear optical path 317. The optical path 317 is "substantially" linear as refractions from the first lens assembly 101 will cause the first lens assembly light 113 to not be perfectly linear.

When the system is in the 3× mode, the controller 108 causes the switchable mirror 105 to enter the reflective state. Where a switchable iris mirror 111 is used, the iris control module 110 causes the switchable iris mirror 111 to enter the reflective state. With the switchable mirror 105 in the reflective state, incident second lens assembly light 114 passes from the second lens assembly 102 to the reflective surface 106. The second lens assembly light 114 then reflects off the reflective surface 106 to the switchable mirror 105, which redirects the second lens assembly light 114 to the image sensor 103 along a nonlinear optical path 307. The result is a 3× system magnification without having physically realigned any lens assembly relative to the image sensor 103.

Figure 7:
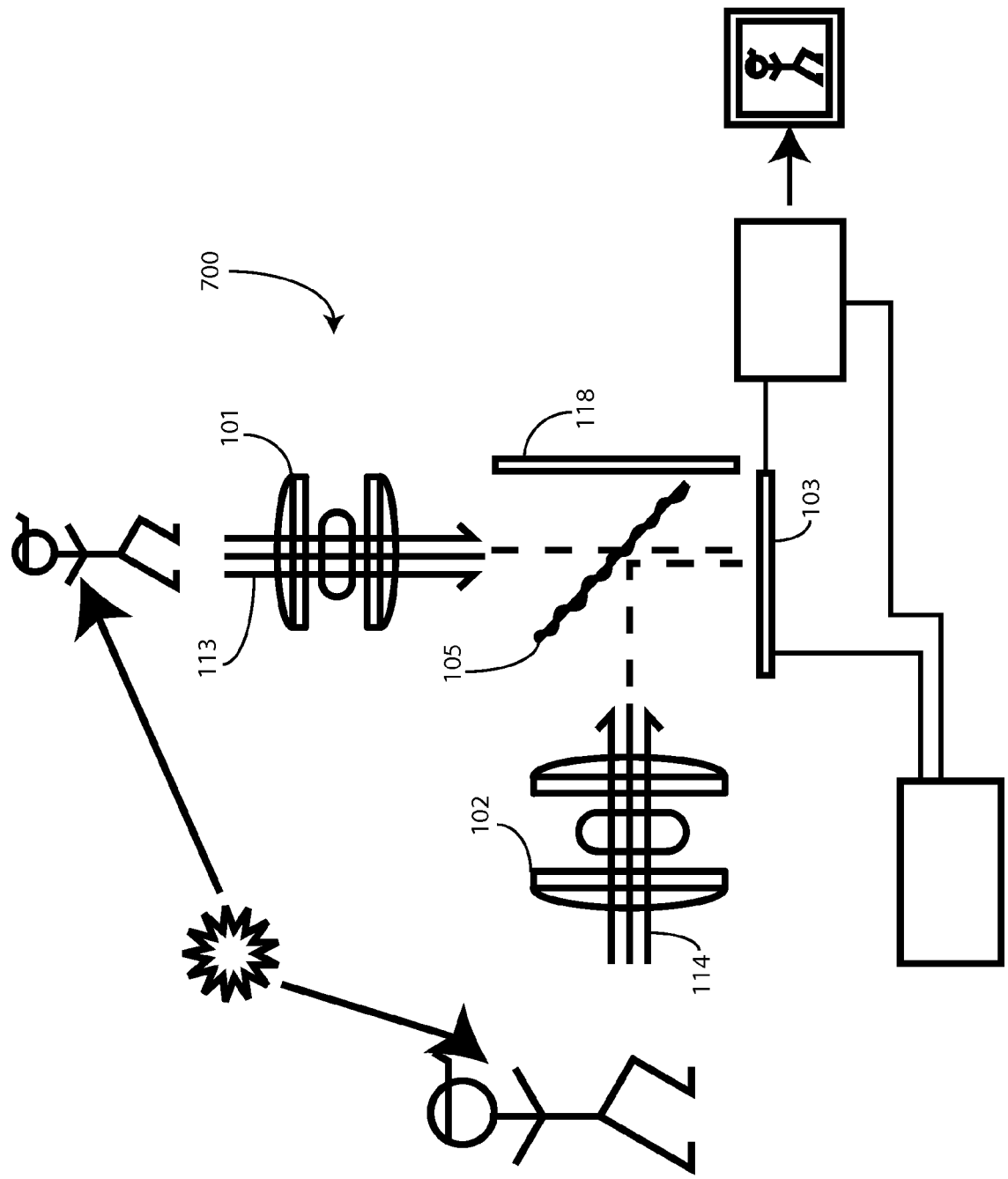
FIG. 7 illustrates a block diagram view of an optical zoom system without a reflective surface in accordance with embodiments of the invention.

Turning now to FIG. 7, illustrated therein is one other alternate embodiment of an optical zoom system 700 in accordance with the invention. The system 700 of FIG. 7 is an orthogonal system in that the first lens assembly 101 and second lens assembly 102 are orthogonally disposed. One advantage of the system of FIG. 7 is that only a single switchable mirror 105 is used.

When the system 700 is in the 1× mode, the switchable mirror 105 is in the pellucid state. First lens assembly light 113 passes through the first lens assembly 101, through the switchable mirror 105, to the image sensor 103. Second lens assembly light 114 passes through the second lens assembly 102, through the switchable mirror 105, to the light absorbing material 118, where it is absorbed.

When the system is in the 3× mode, the switchable mirror 105 is in the reflective state. First lens assembly light 113 passes through the first lens assembly 101 and is reflected off the switchable mirror 105 to the light absorbing material 118. Second lens assembly light 114 passes through the second lens assembly 102 and is reflected off the switchable mirror 105 to the image sensor 103.

Figure 8:
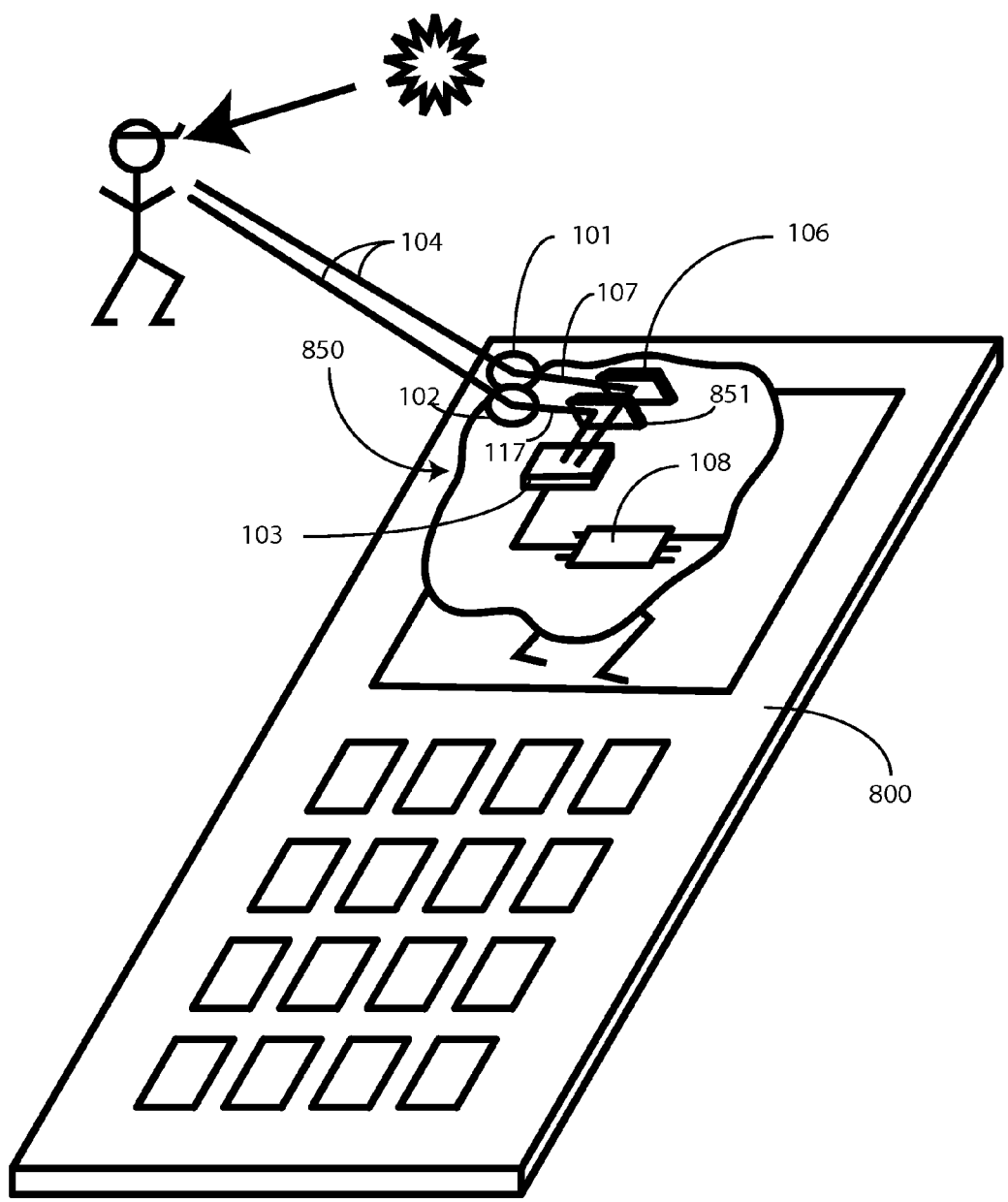
FIG. 8 illustrates a perspective view of an electronic device, with cutaway section, having an electronic optical zoom system in accordance with embodiments of the invention.

Turning now to FIG. 8, illustrated therein is a portable electronic device 800 having an electronically alterable optical zoom system 850 in accordance with embodiments of the invention. The electronically alterable optical zoom system 850, which may be any of the embodiments previously described, is configured to offer optical zoom capabilities without the need for motors or moving lens assemblies.

The electronically alterable optical zoom system 850, in one embodiment, includes an image sensor 103 that is configured to electronically capture images. A first lens assembly 101 and a second lens assembly 102 may be either adjacently disposed or concentrically disposed. Each of the first lens assembly 101 and the second lens assembly are configured to capture and redirect light 104 to the image sensor 103. To provide the optical zoom function, in one embodiment the first lens assembly 101 and the second lens assembly 102 have different magnifications. In other embodiments, a differing length of the optical path is used to achieve the magnification.

The reflective surface 106 is disposed so as to redirect incident light 104 to the image sensor along a first optical path 107. An alterable electronic optical device 851, such as a switchable mirror having at least a reflective state and a pellucid state, is disposed so as to selectively redirect incident light received by one of the first lens assembly 101 or the second lens assembly 102 to the image sensor 103. The alterable electronic optical device 851 does this by redirecting light between a first optical path 107 and a second optical path 117 depending upon the state of the alterable electronic optical device 851.

A controller 108 is coupled to the alterable electronic optical device 851 and is configured to alter light 104 received by the image sensor 103 from the first optical path 107 to the second optical path 117 by changing the state of the alterable electronic optical device 851. The controller 108 thus alters a system image magnification as detected by the image sensor 103 by electronically changing a state of the alterable electronic optical device 851.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic optical zoom system, comprising:
a first lens assembly having a first magnification and a second lens assembly having a second magnification, each lens assembly for collecting and receiving light;
an image sensor;
a switchable mirror axially aligned with the first lens assembly and having electronically selectable states comprising a reflective state and a pellucid state, and being disposed along a first reflected optical path from the first lens assembly and the image sensor;
a reflective surface axially aligned with the second lens assembly;
wherein the first lens assembly and the second lens assembly are stationary relative to the image sensor, and a system image magnification can be varied by electronically altering a state of the switchable mirror to:
redirect the light from the first lens assembly along the first reflected optical path to the image sensor when the switchable mirror is in the reflective state; and
redirect the light from the second lens assembly to the image sensor along a second reflected optical path, through the switchable mirror, when the switchable mirror is in the pellucid state.

2. The electronic optical zoom system of claim 1, wherein the first lens assembly and the second lens assembly are adjacently disposed.

3. The electronic optical zoom system of claim 1, wherein the first lens assembly and the second lens assembly are concentrically disposed.

4. The electronic optical zoom system of claim 1, wherein the reflective surface and the image sensor are concentrically aligned.

5. The electronic optical zoom system of claim 4, wherein the first lens assembly is axially aligned with the image sensor.

6. The electronic optical zoom system of claim 1, further comprising a first switchable iris mirror having first electronically variable aperture states, and disposed so as to limit first lens assembly light upon selection of a first switchable iris mirror aperture state.

7. The electronic optical zoom system of claim 6, further comprising a second switchable iris mirror having second electronically variable aperture states, and disposed so as to limit second lens assembly light upon selection of a second switchable iris mirror aperture state.

8. The electronic optical zoom system of claim 7, further comprising an iris control module coupled to the first switchable iris mirror and the second switchable iris mirror, wherein the iris control module is configured select one of the first electronically variable aperture states for the first switchable iris mirror and one of the second electronically variable aperture states for the second switchable iris mirror.

9. The electronic optical zoom system of claim 1, further comprising a controller coupled to the switchable mirror and the image sensor, wherein the controller is configured to electronically alter the switchable mirror to the reflective state and capture a first magnification image with the image sensor.

10. The electronic optical zoom system of claim 9, wherein the controller is further configured to electronically alter the switchable mirror to the pellucid state and capture a second image magnification image with the image sensor.

11. The electronic optical zoom system of claim 1, further comprising light absorbing material disposed such that when the switchable mirror is in the pellucid state, light passes through the switchable mirror to the light absorbing material.

12. The electronic optical zoom system of claim 11, wherein the reflective surface comprises a second switchable mirror having electronically selectable varying reflectivity states comprising a second switchable mirror pellucid state and a second switchable mirror reflective state.

13. The electronic optical zoom system of claim 12, further comprising additional light absorbing material disposed such that when the second switchable mirror is in the second switchable mirror pellucid state, light passes through the second switchable mirror to the additional light absorbing material.

14. A portable electronic device comprising an electronically alterable optical zoom system, the electronically alterable optical zoom system comprising:
an image sensor;
a first lens assembly and a second lens assembly, each of the first lens assembly and the second lens assembly being configured to capture and direct light to the image sensor, each of the first lens assembly and the second lens assembly having a different magnification;
a switchable mirror axially aligned with the first lens assembly and having electronically selectable states comprising a reflective state and a pellucid state, and being disposed along a first reflected optical path from the first lens assembly and the image sensor; and
a reflective surface axially aligned with the second lens assembly.

15. The portable electronic device of claim 14, further comprising a controller coupled to the switchable mirror to alter light received by the image sensor from the first reflected optical path to a second reflected optical path, thereby altering an image magnification detected by the image sensor, by electronically changing an electrically selectable state of the switchable mirror.

16. The portable electronic device of claim 14, the reflective surface disposed so as to direct incident light to the image sensor along the first reflected optical path.

* * * * *